United States Patent
Xiang et al.

(10) Patent No.: US 12,009,494 B2
(45) Date of Patent: Jun. 11, 2024

(54) THERMAL REGULATORY MODULES USEFUL FOR COOLING ENERGY PACKS

(71) Applicant: Hong Kong Applied Science and Technology Research Institute Co., Ltd., Shatin (HK)

(72) Inventors: Jing Xiang, Ma on Shan (HK); Pau Yee Lim, Ma on Shan (HK); Laiyong Xie, Shenzhen (CN)

(73) Assignee: Hong Kong Applied Science and Technology Research Institute Co., Ltd., Shatin (HK)

( * ) Notice: Subject to any disclaimer, the term of this patent is extended or adjusted under 35 U.S.C. 154(b) by 727 days.

(21) Appl. No.: 17/152,384

(22) Filed: Jan. 19, 2021

(65) Prior Publication Data
US 2022/0231352 A1  Jul. 21, 2022

(51) Int. Cl.
*H01M 10/653* (2014.01)
*H01M 10/613* (2014.01)
*H01M 10/655* (2014.01)

(52) U.S. Cl.
CPC ....... *H01M 10/653* (2015.04); *H01M 10/613* (2015.04); *H01M 10/655* (2015.04)

(58) Field of Classification Search
None
See application file for complete search history.

(56) References Cited

U.S. PATENT DOCUMENTS

| | | | |
|---|---|---|---|
| 7,316,262 B1 | 1/2008 | Rini et al. | |
| 9,431,651 B2 | 8/2016 | Lim et al. | |

(Continued)

FOREIGN PATENT DOCUMENTS

| | | |
|---|---|---|
| CN | 1067256 A | 12/1992 |
| CN | 1803965 A | 7/2006 |

(Continued)

OTHER PUBLICATIONS

Ali Ghahremannezhad, Huijin Xu, Mohammad Reza Salimpour, Pei Wang, Kambiz Vafai, Thermal performance analysis of phase change materials (PCMs) embedded in gradient porous metal foams, Applied Thermal Engineering, vol. 179, pp. 1-18 (Year: 2020).*

(Continued)

*Primary Examiner* — Elizabeth Collister
(74) *Attorney, Agent, or Firm* — Norton Rose Fulbright US LLP

(57) ABSTRACT

Systems and methods in which a thermal conductive composite comprises a non-uniform heat absorption profile of a thermal reactive material are described. Thermal conductive composites herein may be utilized in thermal regulatory modules with a gradient structure configured to transfer heat energy away from an area near a heat source to an area with a relatively large latent heat absorbing capacity. Thermal conductive material may be provided in a frame structure having lower porosity in a first region more near a heat source and higher porosity in a second region more distant from the heat source. A thermal reactive material may be deposited so as to be disposed within the pores of the thermal conductive material frame structure wherein the density of the thermal reactive material in the first region of the thermal conductive composite is lower than that at the second region of the thermal conductive composite.

18 Claims, 6 Drawing Sheets

(56) References Cited

U.S. PATENT DOCUMENTS

| | | |
|---|---|---|
| 10,109,843 B2 | 10/2018 | Xie et al. |
| 2003/0015811 A1 | 1/2003 | Klett et al. |
| 2015/0236386 A1 | 8/2015 | Yang et al. |
| 2016/0049642 A1 | 2/2016 | Jiang et al. |
| 2017/0125866 A1 | 5/2017 | Zhou et al. |
| 2019/0027728 A1 | 1/2019 | Xie et al. |
| 2020/0106124 A1 | 4/2020 | Wang et al. |

FOREIGN PATENT DOCUMENTS

| | | |
|---|---|---|
| CN | 1935932 A | 3/2007 |
| CN | 100999657 A | 7/2007 |
| CN | 102181270 A | 9/2011 |
| CN | 102364747 A | 2/2012 |
| CN | 102561532 A | 7/2012 |
| CN | 102660230 A | 9/2012 |
| CN | 102787508 A | 11/2012 |
| CN | 202758989 U | 2/2013 |
| CN | 103060592 A | 4/2013 |
| CN | 103084215 A | 5/2013 |
| CN | 103234377 A | 8/2013 |
| CN | 102439771 B | 4/2014 |
| CN | 105006547 A | 10/2015 |
| CN | 205425926 U | 8/2016 |
| CN | 106497519 A | 3/2017 |
| CN | 108291783 A | 7/2018 |
| CN | 108598614 A | 9/2018 |
| CN | 109880596 A | 6/2019 |
| CN | 110079277 A | 8/2019 |
| CN | 111728273 A | 10/2020 |

OTHER PUBLICATIONS

The Engineering Toolbox, Coefficients of Linear Thermal Expansion; https://www.engineeringtoolbox.com/linear-expansion-coefficients-d_95.html accessed Oct. 17, 2023. (Year: 2020).*

China National Intellectual Property Administration, First Office Action issued for Chinese Patent Application No. 202180000300.8, dated Oct. 27, 2021, 12 pages with partial English language translation.

Patent Cooperation Treaty, International Search Report and Written Opinion issued for PCT Application No. PCT/CN2021/073918, dated Aug. 27, 2021, 8 pages.

* cited by examiner

THERMAL REGULATORY MODULES USEFUL FOR COOLING ENERGY PACKS

TECHNICAL FIELD

The present invention relates generally to thermal regulation and, more particularly, to thermal regulating modules useful for cooling various forms of heat sources including energy packs, such as energy packs for mobile robotics.

BACKGROUND OF THE INVENTION

Various apparatuses of different applications are prevalent in daily activity in which energy packs or other sources of heat in need of thermal regulation are utilized. For example, mobile robotics (e.g., robotic platforms implementing Automated Guided Vehicles (AGVs), Autonomous Mobile Robots (AMRs), and Unmanned Ground Vehicles (UGVs)) have gained increased popularity in light of the booming worldwide e-commerce and logistic industries. Such robotic platforms often utilize energy packs (e.g., one or more battery cells, such as may comprise lithium ion (Li-ion), lithium iron phosphate ($LiFePO_4$), or other high energy density battery chemistries) to provide driving power for the mobile robotics. The energy modules comprising the energy packs may implement fast charging techniques (e.g., charging at a rate equal to or greater than the hourly capacity of a battery, such as a charging rate 1 C or 2 C, as shown in FIG. 1) to improve operational efficiency of the mobile robotics, to support 24 hour×7 day operation, etc. Effective thermal regulation may, however, be necessary for reliability and safety of the energy packs.

If a battery, such as a battery cell of a mobile robotics energy pack, is charged above the operating temperature of 60° C., the performance, safety and cycle lifetime of the battery is typically significantly impacted. For example, there are three-stages of chain reactions that occur in Li-ion batteries when the temperature (T) of the battery exceeds 60° C. (see e.g., *eTransportation*, 2019, 1, 100011, the disclosure of which is incorporated herein by reference). In the first stage (60° C.<T<110° C.), the plated lithium reacts with the electrolyte and heats the battery. In this stage, the solid electrolyte interphase (SEI) film on the plated lithium surface is continuously decomposed and regenerated, while the temperature rise rate remains relatively low. In the second stage (thermal runaway triggering process, 110° C.<T), the plated lithium is consumed in a large amount in the violent reaction with the electrolyte, causing a sharp increase in temperature. In this stage, the separator collapses, and the cathode and anode connect with each other. The violent reaction and associated heat of the second stage may cause the battery to appreciably expand, often resulting in physical damage to the battery and surrounding components. In the third stage (thermal runaway developing to the highest temperature), other reactions, such as reaction of the anode and electrolyte, reaction of the anode and the cathode, and reaction of the cathode and electrolyte, are triggered due to the sudden rise of temperature. As a result, the battery reaches the maximum temperature of thermal runaway. The reactions and heat resulting from the third stage may cause further expansion of the battery, often resulting in catastrophic failure of the battery casing and significant damage to surrounding components. Accordingly, thermal regulation of an energy pack, particularly with respect to fast charging operation, can be of great importance for safety and battery life.

Thermal management is typically classified into active cooling and passing cooling. Passive cooling techniques utilize materials having various thermal attributes to implement heat gain control. In contrast, active cooling includes techniques such as forced air cooling and forced liquid cooling which use cooling devices implementing moving parts.

The use of active cooling techniques presents a number of drawbacks which renders active cooling generally not suitable for many mobile robotics applications. For example, relatively complicated cooling devices comprising blowers, pumps, etc. are utilized in active cooling. These components are often bulky and are not well suited to fit within the energy module dimensions of mobile robotics vehicles, such as AGVs (e.g., for AGVs used as commercial fetch and freight robots in warehouse, factory, logistic center, etc., the dimension of the energy module may be on the order of 140 mm long, 75 mm wide, and 70 mm high). Moreover, active cooling components require extra energy power input (e.g., for driving the blower and/or pump), which increases the total cost of their use. The potential for leakage of liquid coolant by an active liquid cooling system (e.g., as may contribute to short circuit of the battery) may also present sufficient concern for discouraging use of active cooling in some situations.

The use of passive cooling techniques may be more suitable than active cooling techniques for many mobile robotics applications, such as for use with respect to AGVs. Accordingly, a number of existing passive cooling techniques have been proposed.

For example, US20170125866A1 discloses a passive cooling technique implementing a casing of a uniformly porous thermally conductive material comprising a phase change material. The casing is applied for cooling the entire energy module rather than individual batteries.

CN202758989U discloses a cooling technique implementing a phase change material and heat pipe configuration. The configuration provides a uniform distribution of the phase change material filled in the gap between single battery cells of a battery pack and in the space between the battery pack and the battery case, wherein one end of the heat pipes are disposed in the phase change material and the other end of the heat pipes are connected to cooling unit.

US20030015811A1 discloses a carbon foam heat sink as may be used for passive cooling techniques. The carbon foam heat sink comprises encased high thermal conductivity uniformly porous carbon foam filled with a phase change material, wherein thermal energy are stored and emitted very rapidly. The porous carbon foam may, however, be electrically conductive which is generally not favorable for energy module application due to the potential risk of short circuit.

U.S. Pat. No. 7,316,262B1 discloses a cooling technique implementing a heat absorber which includes a uniformly porous host material with high thermal conductivity within which a phase change material is stored. The phase change material as placed into the host material is substantially uniformly distributed. The host material that encloses the phase change material comprises a metal foam or graphite foam material, such as may be electrically conductive and not favorable for energy module application due to the potential risk of short circuit.

US20150236386A1 discloses a cooling technique implementing a cooling structure having microfibrous media with a phase change material and a sheet metal shell for battery cooling. The microfibrous media is thermally conductive and provides fast heat transfer to the phase change materials.

The phase change material is substantially uniformly distributed within the microfibrous media.

Existing passive cooling techniques are often insufficient to provide adequate thermal regulation with respect to energy packs for supporting fast charging to full battery capacity. As a concession, the batteries of an energy pack may only be partially charged (e.g., up to approximately 70% of the battery capacity) and then the charge current subjected to cut-off by a Battery Management System (BMS) to avoid exposing the batteries to high temperatures. As illustrated in the example of FIGS. 2A and 2B, energy pack 200 (e.g., an AGV energy pack comprising a configuration of 7 batteries in series connection, 4 batteries in parallel connection (7S4P)) may be provided fast charging (e.g., charging rate: 1 C (10 A), voltage range: 23.1-29.4V, ambient temperature: 25° C., charging time: 60 min) and the battery temperatures monitored at several points (e.g., points P1, P2, P3, P4, and P5), demonstrating the presence of unacceptably high temperatures prior to reaching a full State of Charge (SOC). In the example illustrated in FIGS. 2A and 2B, a BMS monitoring the battery temperature would operate to terminate the fast charge cycle when the energy pack was returned to only approximately 70% capacity (e.g., a charge capacity approximately 30% less than a full SOC) at 60° C.

BRIEF SUMMARY OF THE INVENTION

The present invention is directed to systems and methods in which a thermal conductive composite comprises a non-uniform heat absorption profile of a thermal reactive material. A thermal conductive composite of embodiments of the present invention may, for example, be utilized in providing thermal regulatory modules with a gradient structure configured to transfer heat energy away from an area near a heat source to an area with a relatively large latent heat absorbing capacity. Thermal regulatory modules implementing a thermal conductive composite in accordance with concepts herein may be utilized to provide improved cooling efficiently, particularly with respect to internal zones in a large energy module. Thermal regulatory modules of embodiments of the invention are well suited for use in energy packs for mobile robotics or other heat energy sources that benefit from rapid heat cooling performance.

A thermal conductive composite of embodiments of the invention may, for example, comprise a thermal conductive material (e.g., a material exhibiting good thermal energy transfer characteristics and having a low linear thermal expansion coefficient) and a thermal reactive material (e.g., phase change material capable of absorbing, storing, and releasing thermal energy). According to embodiments of the invention, the thermal conductive material may be provided in a frame structure (e.g., rigid frame) having a plurality of pores (e.g., macro and/or meso porous), wherein lower porosity is provided in an area of the frame structure to be positioned more near a heat source (e.g., battery of an energy pack) and higher porosity is provided in an area of the frame structure to be positioned more distant from the heat source.

In preparing a thermal conductive composite comprising a thermal conductive material frame structure according to embodiments, the frame structure surface may be functionalized to provide a chemical coupling interface encouraging chemically enhanced connection of the thermal conductive material particles. For example, surface treatment and coupling preparation may be performed for enhanced connection between particles of one or more materials of the thermal conductive composite material. Such enhanced thermal conductive connection may stabilize the frame structure and/or facilitate transfer of heat energy through the structure of embodiments.

A thermal reactive material may be deposited so as to be disposed within the pores of the thermal conductive material frame structure wherein the density of the thermal reactive material in a first region of the thermal conductive composite is lower than that at a second region of the thermal conductive composite. The foregoing configuration of thermal conductive material and thermal reactive material may provide a thermal conductive composite with a gradient structure configured to transfer heat energy to an area of the thermal conductive composite with a relatively large latent heat absorbing capacity. For example, the gradient structure of a thermal conductive composite of embodiments may provide a non-uniform heat absorption profile configured to transfer heat energy away from an area near a heat source to an area with a relatively large latent heat absorbing capacity. Further, the solid frame structure provided by the thermal conductive material with a low linear thermal expansion coefficient according to embodiments of the invention may avoid or mitigate shape deformation or phase separation, such as may happen during a heat absorbing process using mere heat absorbing media.

Thermal conductive composites having a non-uniform heat absorption profile according to embodiments of the present invention combines advantages high thermal conductivity of the thermal conductive material in a gradient frame structure and heat absorbing ability of the thermal reactive material to provide cooling efficiency. The use of non-uniform, differentiated thermal reactive material density in the thermal conductive composite may, for example, provide an overall higher thermal conductivity within a first region closer to a heat source and an overall lower thermal conductivity within a second region remote from the heat source. Accordingly, heat may not be trapped in a central portion of a thermal regulatory module comprised a thermal conductive composite according to concepts herein, which may effectively reduce the overall maximum temperature of the thermal regulatory module. Embodiments of the present invention may, for example, be utilized in providing thermal regulatory modules allowing batteries to be fast charged (e.g., at a charging rate above 1 C) without exposing users and equipment (e.g., an AGV) to safety risk.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
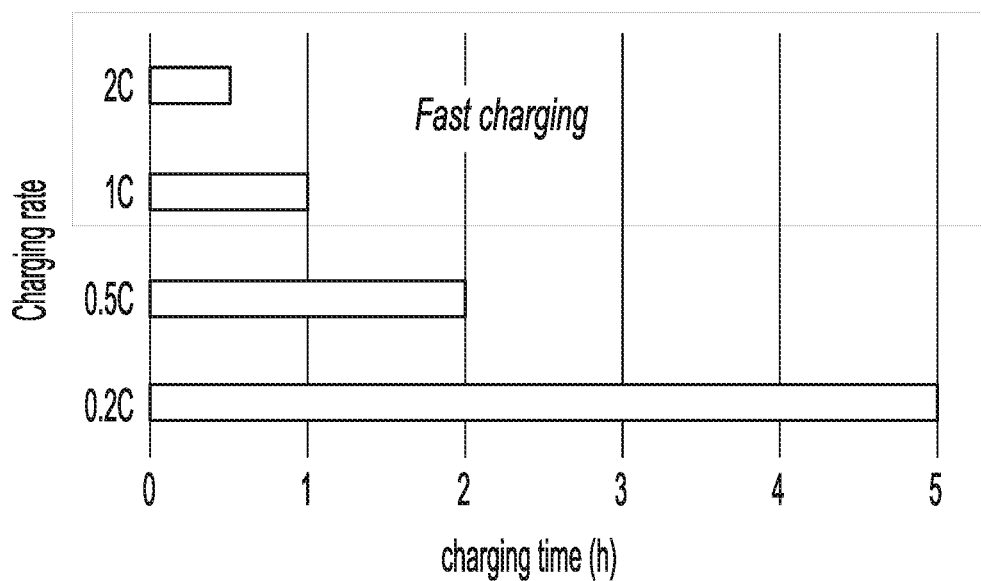
FIG. 1 shows a graph illustrating the relationship between charging rate and charging time.
Figure 2A:
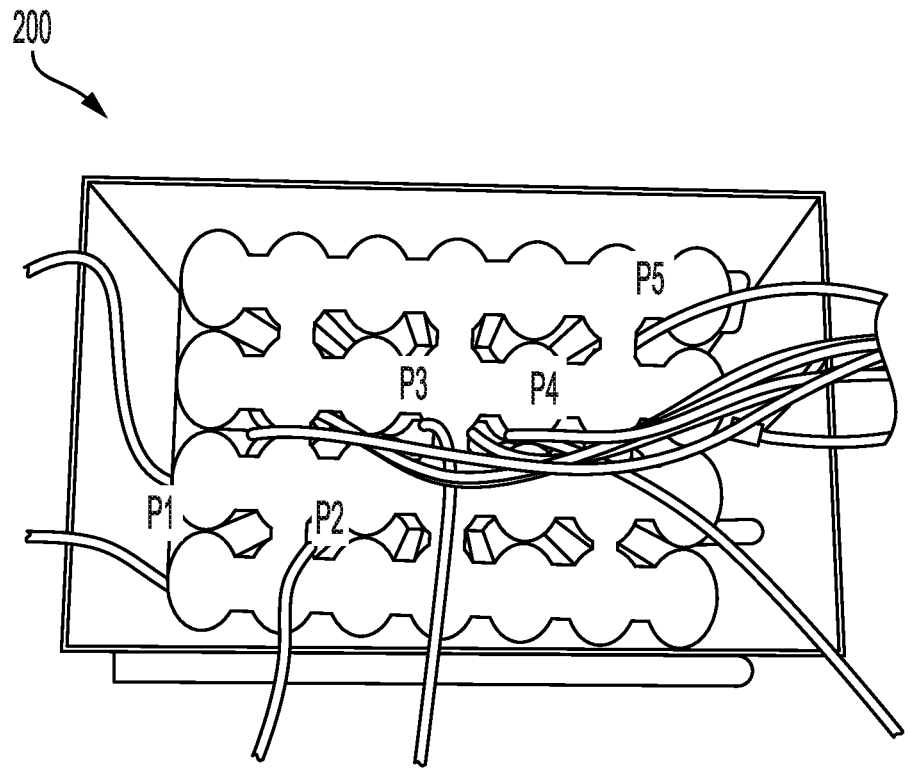
FIG. 2A shows an energy pack comprising a configuration of 7 batteries in series connection, 4 batteries in parallel connection (7S4P)
Figure 2B:
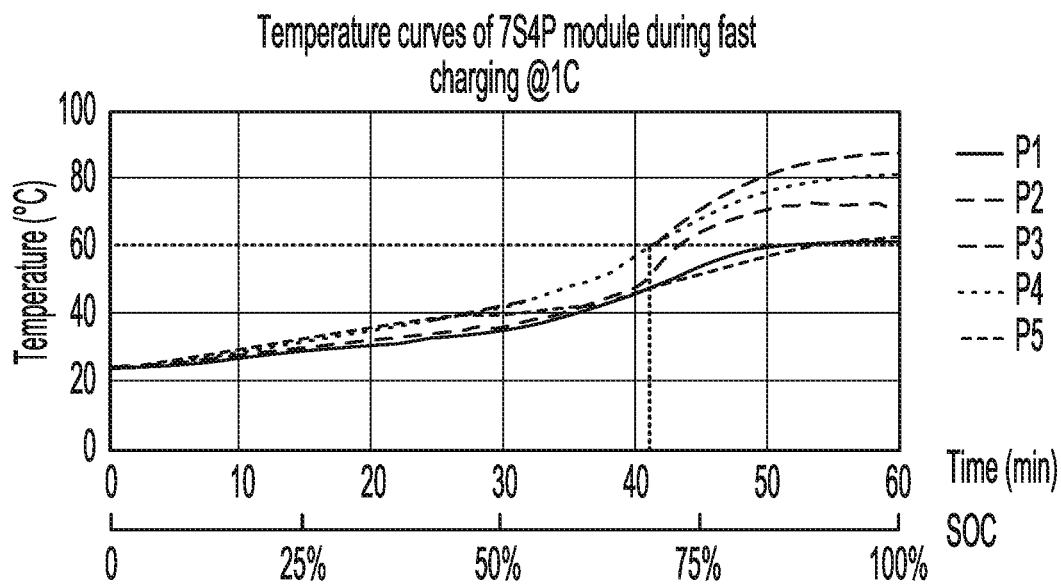
FIG. 2B shows a graph illustrating battery temperatures monitored at several points on the energy pack of FIG. 2A.
Figure 3A:
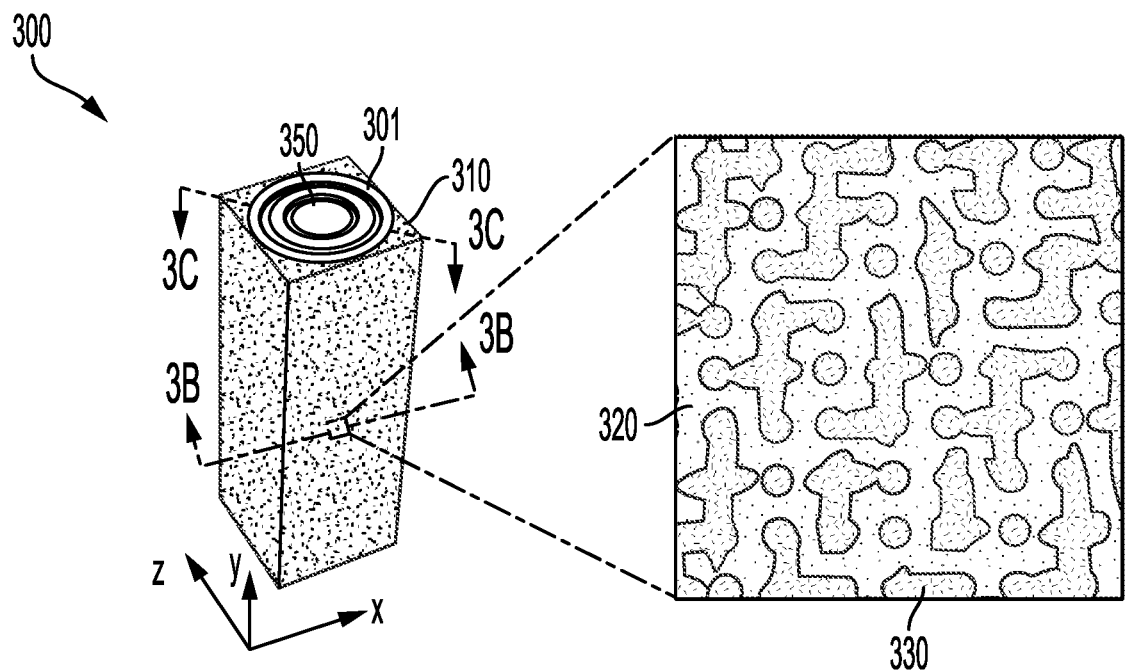
FIG. 3A-3C show a thermal regulatory module comprised of a thermal conductive composite of embodiments of the present invention.
Figure 3B:
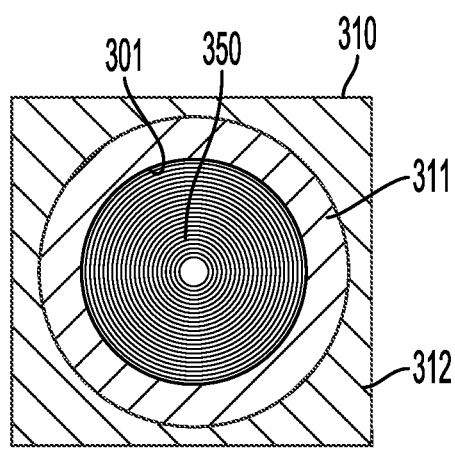
Figure 3C:
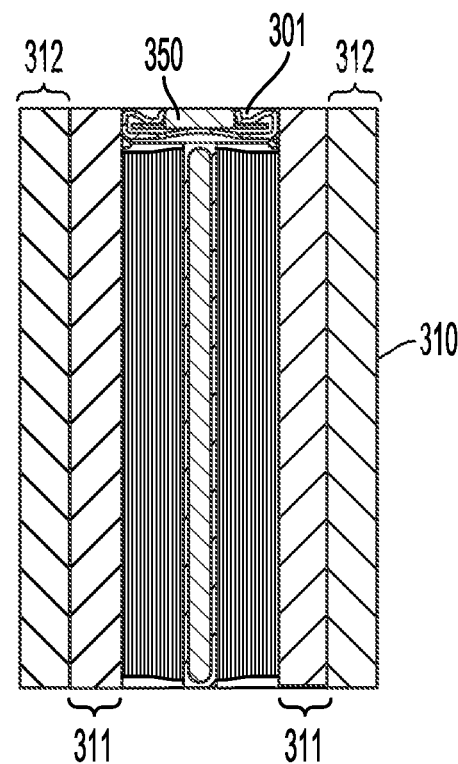

FIGS. 3A-3C show a thermal regulatory module comprised of a thermal conductive composite of embodiments of the present invention. In particular, thermal regulatory module 300 formed using thermal conductive composite 310 provided according to concepts herein. Thermal regulatory module 300 of embodiments may be utilized with respect to various forms of heat sources. For example, thermal regulatory module 300 may comprise a part of a thermal regulatory cooling block used with respect to an energy pack for mobile robotics, wherein one or more heat sources are present in the form of batteries. Accordingly, the illustrated embodiment of thermal regulatory module 300 includes cavity 301 in which a heat source (e.g., battery cell 350) may be disposed to interface with thermal conductive composite 310 to benefit from rapid heat cooling performance provided thereby. Thermal regulatory module 300 of embodiments may, for example, be utilized in a thermal regulatory cooling block configuration allowing batteries to be fast charged (e.g., at a charging rate above 1 C) without exposing users and equipment (e.g., an AGV) to safety risk. It should be understood, however, that thermal regulatory module 300 and/or thermal conductive composite 310 are not limited to use with respect to energy packs or their batteries, and thus may be utilized with respect to other heat energy sources that would benefit from rapid heat cooling performance.

Thermal conductive composite 310 of embodiments of the present invention comprises a gradient structure configured to transfer heat energy away from an area near a heat source (e.g., the area adjacent to cavity 301) to an area with a relatively large latent heat absorbing capacity (e.g., the area towards the outer edges of thermal regulatory module 300). For example, thermal conductive composite 310 of embodiments comprises thermal conductive material 320 and thermal reactive material 330 configured for a non-uniform heat absorption profile of the thermal reactive material.

Thermal conductive material 320 may comprise one or more materials exhibiting good thermal energy transfer characteristics and having a low linear thermal expansion coefficient. For example, thermal conductive material 320 of embodiments may comprise an electrically insulative (resistivity>$10^9$ Ω·m), thermal conductive (e.g., >5 W/(m·K)), low linear thermal expansion coefficient (e.g., <$10^{-5}$/K) material having a particle size in the range of 10 nm-20 μm. According to some examples, thermal conductive material 320 may comprise aluminum oxide ($Al_2O_3$), silicon nitride ($Si_3N_4$), silicon carbide (SiC), and/or boron nitride (BN).

Thermal reactive material 330 may comprise one or more phase change materials (PCMs) capable of absorbing, storing, and releasing thermal energy. For example, thermal reactive material 330 of embodiments may comprise a material, such as paraffins, salt hydrates and fatty acids that changes phase or state over a defined temperature range (e.g., a temperature range within 20-60° C.). According to some examples, thermal reactive material 330 may comprise one or more alkane, such as Eicosane ($C_{20}H_{42}$), and/or other heat absorbing media.

According to embodiments of thermal conductive composite 310, thermal conductive material 320 is provided in a frame structure (e.g., rigid frame). For example, thermal conductive composite 310 may be formed into a solid frame structure corresponding to a desired size and shape of thermal regulatory module 300. Such a frame structure comprised of thermal conductive composite 310 of embodiments may have a low linear thermal expansion coefficient which, in heat energy transfer operation, may avoid or otherwise mitigate shape deformation or phase separation of thermal reactive material 320.

As shown in the magnified portion of FIG. 3A, thermal conductive material 320 is provided in a porous configuration, wherein thermal reactive material 320 may be hosted in a plurality of pores to provide thermal conductive composite 310. For example, thermal conductive material 320 as formed into a frame structure may have a plurality of macro and/or meso pores.

In accordance with embodiments of the invention, however, the distribution of pores within thermal conductive material 320 is non-uniform. Thermal conductive material 320 of embodiments of the invention may comprise a non-uniform distribution of pores having a gradient porous structure in which areas of lower porosity and higher porosity are defined. For example, thermal conductive material 320 may be provided in a gradient porous structure in which lower porosity is provided in an area of the frame structure to be positioned more near a heat source and higher porosity is provided in an area of the frame structure to be positioned more distant from the heat source. As illustrated in the cross sectional views of FIGS. 3B (X-sectional view) and 3C (Y-diagonal view), thermal conductive composite 310 may be configured such that a density of pores within thermal conductive material 320 within area 311 (e.g., first region near or adjacent to cavity 301) has a lower density of pores (e.g., porosity in the volume ratio range of 0%-50%, in some examples 1%-50%, in other examples 10%-50%) and a higher density of thermal conductive material. In contrast, thermal conductive composite 310 may be configured such that a density of pores within thermal conductive material 320 within area 312 (e.g., a second region near or adjacent to the outer edges of thermal regulatory module 300) shown in FIGS. 3B and 3C has a higher density of pores (e.g., porosity in the volume ratio range of 30%-100%, in some examples 30%-99%, in other examples 30%-80%) and a lower density of thermal conductive material. According to some examples, the porosity of thermal conductive material 320 within a first region (e.g., area 311) is 10% by volume ratio and the porosity of thermal conductive material 320 within a second region (e.g., area 312) is 60% by volume ratio.

It should be appreciated that, although the examples illustrated in FIGS. 3B and 3C show a relatively clear demarcation between areas of lower porosity and higher porosity, embodiments of the invention may implement various configurations of gradient porous structures. For example, transition between lower porosity and higher porosity may be gradual such that an appreciable area of changing porosity is provided between an area of lowest porosity and an area of highest porosity. Additionally or alternatively, gradient porous structures implemented according to embodiments may comprise different numbers of defined areas of porosity. As an example, thermal conductive composite 310 may be configured such that a density of pores within thermal conductive material 320 within a first area has a lower density of pores, within a second area has a mid-level density of pores, and a third area has a higher density of pores.

According to embodiments of thermal conductive composite 310, thermal reactive material 330 is deposited so as to be disposed within the pores of thermal conductive material 320. In accordance with some embodiments, thermal reactive material 330 may be encased inside the macro and/or meso pores of thermal conductive material 320. In embodiments wherein thermal conductive material 320 is provided in a gradient porous structure, the volume ratio density of thermal reactive material 330 in a first region of thermal conductive composite 310 is lower than that at a second region of the thermal conductive composite. For example, as illustrated in the cross sectional views of FIGS. 3B and 3C, thermal conductive composite 310 may be configured such that a volume ratio density of thermal reactive material 330 within area 311 is lower (e.g., thermal reactive material comprising 0%-50% of the thermal conductive composite, in some examples 1%-50% of the thermal conductive composite, in other examples 10%-50% of the thermal conductive composite), whereas a volume ratio density of thermal reactive material 330 within area 312 may be higher (e.g., thermal reactive material comprising 30%-100% of the thermal conductive composite, in some examples 30%-99% of the thermal conductive composite, in other examples 30%-80% of the thermal conductive composite).

The foregoing embodiment of thermal conductive composite 310 comprising a gradient structure with respect to thermal conductive material 320 and thermal reactive material 330 is configured to transfer heat energy to an area of the thermal conductive composite with a relatively large latent heat absorbing capacity. For example, low porosity in the inner frame structure (e.g., close to a heat source) providing more thermal conductive material with less thermal reactive material (e.g., heat absorbing media) and high porosity in the outer frame (e.g., away from the heat source) providing less thermal conductive material with more thermal reactive material according to the gradient structure of embodiments facilitates transfer of heat energy through the frame structure away from the heat source. That is, the gradient structure of thermal conductive composite 310 may provide a non-uniform heat absorption profile configured to transfer heat energy from an area near a heat source (e.g., area 311 adjacent to cavity 301) to an area with a relatively large latent heat absorbing capacity (e.g., area 312 towards the outer edges of thermal regulatory module 300). Such a gradient structure configuration of embodiments may be utilized to provide improved cooling efficiency implementations, such as with respect to the internal zones in a large energy pack (e.g., an energy pack comprising a plurality of batteries).

Figure 4:
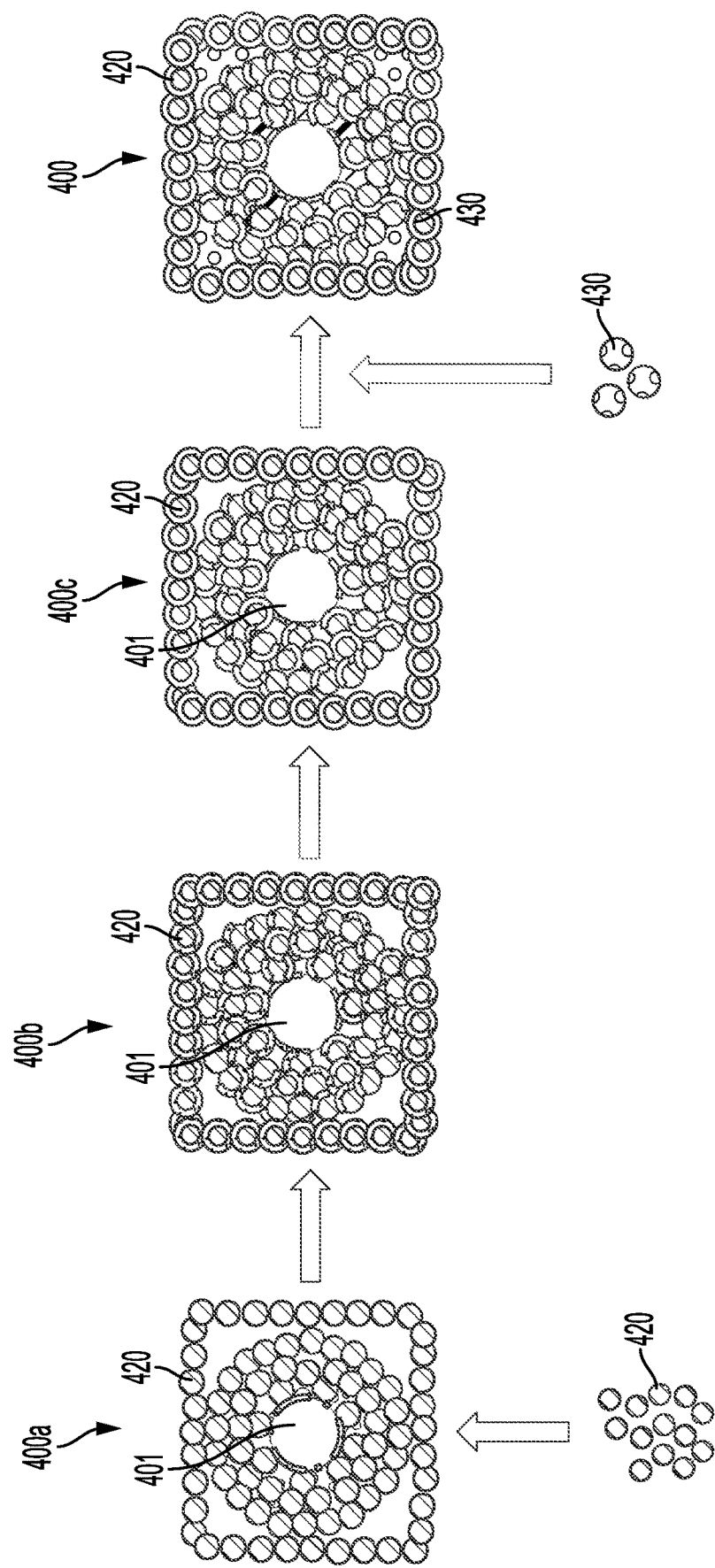
FIG. 4 shows a process for preparing a thermal regulatory module comprised of a thermal conductive composite of embodiments of the present invention.

A process for preparing a thermal regulatory module comprised of a thermal conductive composite of embodiments of the present invention is shown in FIG. 4. In particular, FIG. 4 illustrates various states of formation of thermal regulatory module 400 (e.g., shown from a top view) formed from a thermal conductive composite comprising thermal conductive material 420 and thermal reactive material 430. Thermal regulatory module 400 may, for example, comprise an implementation of thermal regulatory module 300 of FIGS. 3A-3C. Similarly, thermal conductive material 420 and thermal reactive material 430 may comprise implementations of thermal conductive material 320 and thermal reactive material 330 of FIGS. 3A-3C.

The process illustrated in FIG. 4 begins with the construction of conductive skeleton 400a from thermal conductive material 420 (e.g., $Al_2O_3$, $Si_3N_4$, SiC, BN, etc.). Conductive skeleton 400a may, for example, comprise a frame structure (e.g., rigid frame) having a plurality of pores (e.g., macro and/or meso porous) formed from thermal conductive material 420. A fabrication process utilized in forming conductive skeleton 400a may comprise cold press-sintering of thermal conductive material 420 to provide a continuous solid network of the thermal conductive material. Additional or alternative fabrication processes utilized in forming conductive skeleton 400a of embodiments may include a sol-gel method, electrospinning, centrifugation, 3D-printing, etc.

Conductive skeleton 400a of embodiments of the invention provides a frame structure establishing the general shape for a thermal regulatory module to comprise a thermal conductive composite and which is configured to transfer heat energy away from an area near a heat source to an area with a relatively large latent heat absorbing capacity in accordance with concepts herein. For example, the conductive skeleton may be configured to receive and interface with a heat source. Accordingly, the illustrated embodiment of conductive skeleton 400a includes cavity 401 shaped and sized to receive and interface with a heat source (e.g., one or more battery cells) for which thermal regulatory cooling is to be provided. The illustrated embodiment of conductive skeleton 400a also includes an exoskeleton portion of relatively densely packed thermal conductive material 420, such as may be provided to facilitate rigidity of the frame structure.

In accordance with embodiments of the invention, conductive skeleton 400a comprises a gradient porous structure, wherein lower porosity is provided in a first area (e.g., an area of the frame structure to be positioned more near a heat source, such as the area surrounding cavity 401) and higher porosity is provided in a second area (e.g., an area of the frame structure to be positioned more distant from the heat source, such as the area near the exoskeleton portion of the conductive skeleton). In accordance with some embodiments, cold press-sintering of one or more inner layers of thermal conductive material 420 may utilize higher pressure to produce lower porosity (e.g., 0%-50% porosity, in some examples 1%-50% porosity, in other examples 10%-50% porosity) within the thermal conductive material of those one or more layers. Correspondingly, cold press-sintering of one or more outer layers of thermal conductive material 420 may utilize lower pressure to produce higher porosity (e.g., 30%-100% porosity, in some examples 30%-99% porosity, in other examples 30%-80% porosity) within the thermal conductive material of those one or more layers.

In preparing the thermal conductive composite of thermal conductive module 400, the frame structure surface of conductive skeleton 400a may be functionalized to provide a chemical coupling interface for stabilizing the frame structure and/or encouraging heat transfer through the conductive skeleton. For example, surface treatment and coupling preparation may be performed for enhanced connection between particles of one or more of the thermal conductive materials.

In accordance with the process illustrated in FIG. 4, a surface treatment is applied to conductive skeleton 400a for facilitating chemical coupling of thermal conductive material 420 particles of conductive skeleton 400a, such as to other particles of thermal conductive material 420 and/or particles of thermal reactive material 430. For example, functionalized conductive skeleton 400b comprising hydroxylated and methoxylated, having a substituted silyl group introduced, surfaces (hydroxylated/methoxylated/silylation surfaces) of the frame structure may be prepared from conductive skeleton 400a using a surface treatment comprising hydrogen peroxide ($H_2O_2$).

Functionalized conductive skeleton 400b may be further processed for providing a chemical coupling interface for thermal conductive material 420 particles according to the process illustrated in FIG. 4. For example, chemical coupling enhanced conductive skeleton 400c may be prepared from functionalized conductive skeleton 400b using one or more silane coupling agents (e.g., $Y(CH_2)_nSiX_3$).

Chemical coupling enhanced conductive skeleton 400c of embodiments implements a chemical coupling interface facilitating a durable bond between thermal conductive material 420 particles and other particles of thermal conductive material 420 and/or particles of thermal reactive material 430. The coupling provided by chemical coupling enhanced conductive skeleton 400c may be utilized to provide an enhanced connection of particles of the materials to stabilize the frame structure and/or provide efficient heat transfer by the thermal conductive composite.

Although the foregoing example describes surface treatment of the material of thermal conductive material 420 used to form conductive skeleton 400a after the construction of the conductive skeleton, one or more aspects of a surface treatment regimen may be performed at different points in a process for preparing a thermal regulatory module according to embodiments of the present invention. For example, preparation of functionalized conductive material (e.g., using a surface treatment comprising $H_2O_2$) may be performed with respect to thermal conductive material 420 prior to forming conductive skeleton 400a. Additionally, processing of functionalized conductive material (e.g., using one or more silane coupling agents) may be performed with respect to the functionalized conductive material prior to forming conductive skeleton 400a.

The process illustrated in FIG. 4 proceeds with preparation of a thermal conductive composite by depositing thermal reactive material 430 so as to be disposed within the pores of thermal conductive material 420 of chemical coupling enhanced conductive skeleton 400c, whereby thermal conductive module 400 of embodiments is formed. For example, thermal reactive material 430 may be injected into chemical coupling enhanced conductive skeleton 400c to fill the gradient structure pores. In accordance with embodiments of the invention, thermal reactive material 430 may be heated to enter a fluid or less viscous phase to facilitate introduction of the thermal reactive material into the pores of thermal conductive material 420.

A thermal regulatory module comprising a thermal conductive composite implementing a gradient structure of thermal conductive material having a thermal reactive material therein according to embodiments of the invention may comprise a part of a larger thermal regulatory cooling block. For example, thermal conductive module 400 may be provided for use with respect to an energy pack for mobile robotics, wherein one or more heat sources are present in the form of batteries. Accordingly, in addition to the process illustrated in FIG. 4, various processing and/or assembly operations may be performed with respect to a thermal conductive module of embodiments of the invention.

Figure 5:
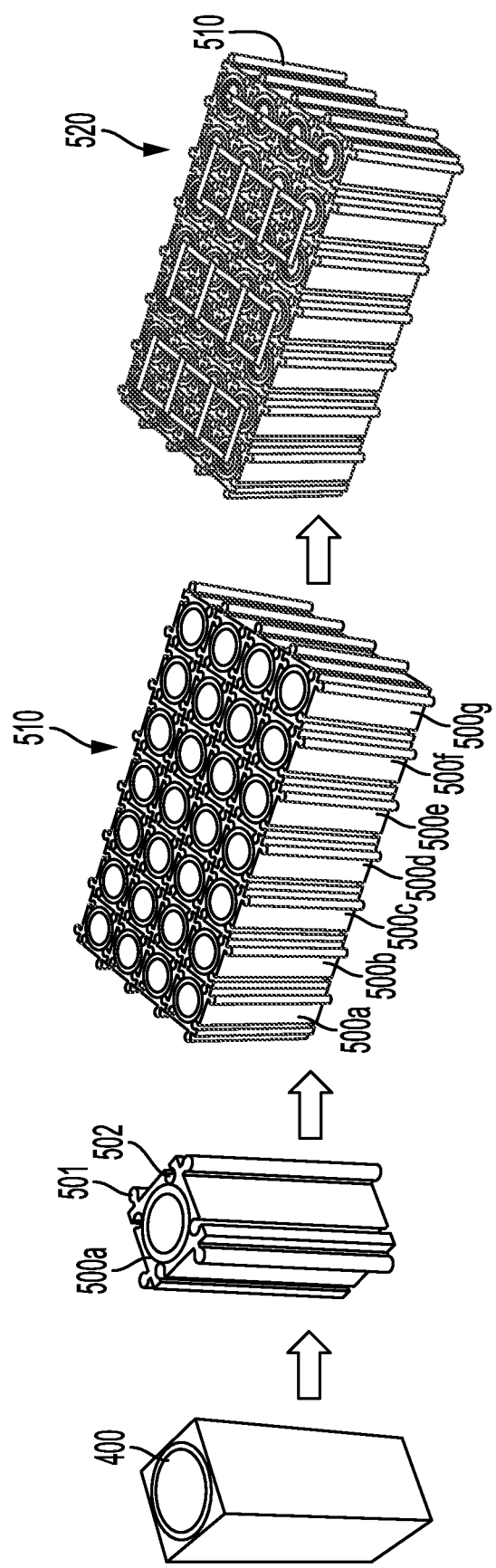
FIG. 5 shows an example of processing and assembly operations performed with respect to thermal conductive modules for providing a thermal regulatory cooling block according to embodiments of the invention.

FIG. 5 shows an example of processing and assembly operations performed with respect to thermal conductive module 400 for providing a thermal regulatory cooling block according to some embodiments of the invention. In the example illustrated in FIG. 5, thermal conductive module 400 is processed in order to configure (e.g., shape) the module for integration with additional instances of thermal conductive modules. For example, thermal conductive module 400 may be machined (e.g., an exoskeleton portion of the thermal conductive module being milled, drilled, turned), such as through the use of a computer numerical control (CNC) machine or other subtractive manufacturing process, provide thermal conductive cooling block unit 500a having one or more tenona (e.g., tenon 501) and/or mortises (e.g., mortise 502) thereon for interlocking interfacing with corresponding mortises and/or tenona of other instances of thermal conductive modules. A plurality of instances of thermal conductive cooling block units (e.g., thermal conductive cooling block units 500a-500g etc.) may be assembled (e.g., interlocked together using corresponding tenona and mortises) to form thermal regulatory cooling block 510.

Thermal regulatory cooling block 510 of the example shown in FIG. 5 is configured for use with respect to an energy pack comprising a plurality of batteries. In particular, thermal regulatory cooling block 510 provides a 7×4 thermal conductive cooling block unit structure, such as may be utilized to host 28 batteries of an energy pack. Energy pack 520 is an example of thermal regulatory cooling block 510 having batteries disposed within the cavities of the thermal cooling block units providing a 7S4P configuration of 7 batteries in series connection, 4 batteries in parallel connection. The thermal conductive composite configuration of thermal regulatory cooling block 510 is configured to provide cooling efficiency with respect to the batteries of the energy pack using a non-uniform heat absorption profile in which high thermal conductivity of the thermal conductive material is provided in a gradient frame structure and heat absorbing ability of the thermal reactive material is more dense in areas away from the batteries. That is, the heat absorbing media with a large latent heat and a gradient structure design of embodiments of thermal regulatory cooling block 510 facilitate improved cooling efficiency, especially for the internal batteries of energy pack 520. For example, in operation of embodiments of energy pack 520, heat is not trapped near the batteries but is instead conducted away from the batteries by the thermal conductive material for absorption of the heat by the thermal reactive material concentrated more densely in areas of the thermal regulatory cooling block, which effectively reduces the overall maximum temperature of the thermal regulatory cooling block. Embodiments of the thermal regulatory cooling block 510 may, for example, be utilized in allowing the batteries of energy pack 520 to be fast charged (e.g., at a charging rate above 1 C) without exposing users and equipment (e.g., an AGV) to safety risk.

Figure 6A:
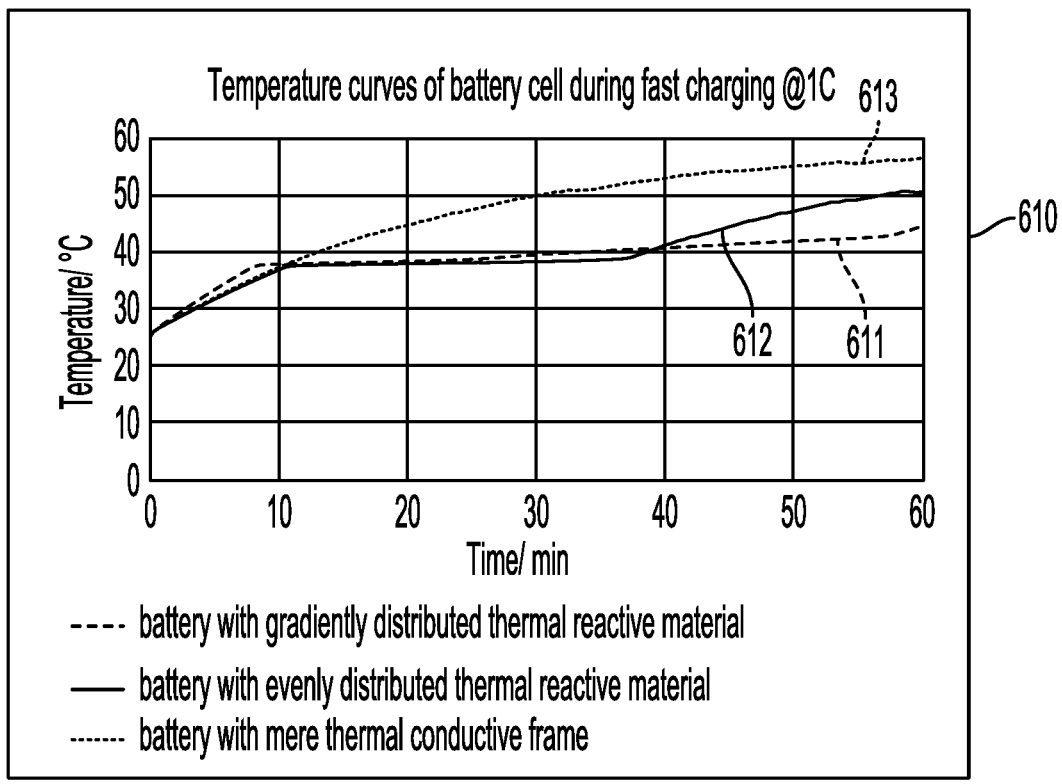
FIGS. 6A and 6B show graphs illustrating improved cooling efficiency as may be realized according to embodiments of the present invention.
Figure 6B:
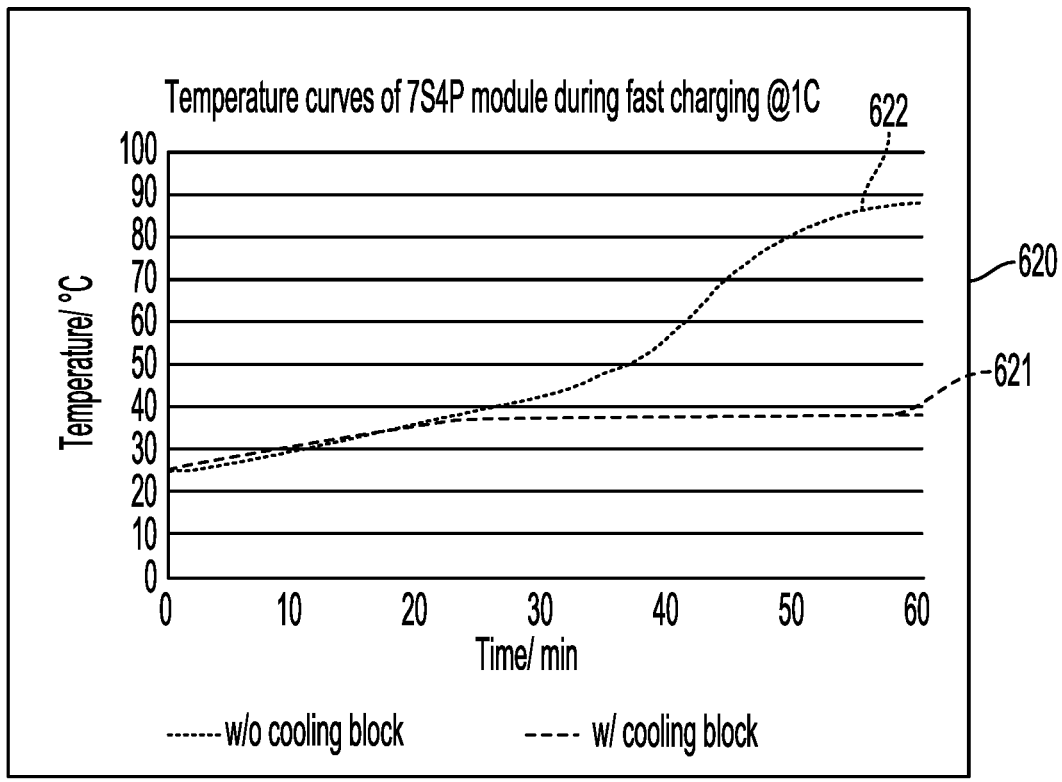

The graphs of FIGS. 6A and 6B illustrate improved cooling efficiency as may be realized according to embodiments of the present invention. In particular, graph 610 of FIG. 6A shows a comparison of simulated battery temperatures during a fast charging process (e.g., 1 C charging rate) for configurations in which the battery is provided cooling by (i) a thermal conductive composite implementing a gradient structure of an embodiment of the invention, (ii) a thermal conductive composite having a uniform porous structure, and (iii) a thermal conductive structure not having a thermal reactive material. Graph 620 of FIG. 6B shows a comparison of simulated battery temperature for a 7S4P energy pack during a fast charging process (e.g., 1 C charging rate) for configurations in which the batteries (i) are provided cooling by a thermal regulatory cooling block having a thermal conductive composite implementing a gradient structure of an embodiment of the invention and (ii) are not provided cooling by a cooling block.

Plot 611 of graph 610 in FIG. 6A shows battery temperature over time for simulated fast charging of the battery when provided cooling using a thermal conductive composite (using a volume ratio of 30% thermal reactive material) implementing a gradient structure of an embodiment of the invention. For comparison, plot 612 of graph 610 shows battery temperature over time for simulated fast charging of the battery when provided cooling using a thermal conductive composite (again using a volume ratio of 30% thermal reactive material) having a uniform porous structure, and plot 613 of graph 610 shows battery temperature over time for simulated fast charging of the battery when provided cooling using a thermal conductive structure not having a thermal reactive material. As can be seen in the plots of graph 610, the thermal conductive composite implementing a gradient structure held the battery temperature below 50° C., whereas the thermal conductive composite having a uniform porous structure and the thermal conductive structure not having a thermal reactive material allowed the battery temperature to exceed 50° C. (the thermal conductive structure not having a thermal reactive material allowing the battery temperature to exceed 55° C.). The simulated results illustrate that heat generated during a fast charging process is not absorbed in thermal conductive structure alone. In contrast, the gradient structure of a thermal conductive composite having a lower porosity inner layer of thermal conductive material produces a higher thermal conductivity region facilitating faster heat transfer to thermal reactive material providing a heat absorbing media, thereby providing a more efficient cooling effect.

Plot 621 of graph 620 in FIG. 6B shows battery temperature over time for simulated fast charging of a 7S4P energy pack for a thermal regulatory cooling block having a thermal conductive composite implementing a gradient structure (using a volume ratio of 10% thermal reactive material in the inner layers of each thermal conductive cooling block unit and a volume ratio of 60% thermal reactive material in the outer layers of each thermal conductive cooling block unit) of an embodiment of the invention. For comparison, plot 622 of graph 620 shows battery temperature over time for simulated fast charging of a 7S4P energy pack for without a cooling block. The simulated results illustrate that application of a cooling structure of embodiments of the present invention may be used to hold the maximum battery temperatures below 40° C. when a 7S4P energy pack undergoes a 1 C fast charging process.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, the scope of the present application is not intended to be limited to the particular embodiments of the process, machine, manufacture, composition of matter, means, methods and steps described in the specification.

What is claimed is:

1. A thermal conductive composite comprising:
   a thermal conductive material having a plurality of pores providing a gradient porous structure having a first region of lower porosity and second region of higher porosity, wherein the porosity in the first region is within a range of 0%-50% by volume ratio and the porosity in the second region is within a range of 30%-100% by volume ratio; and
   a thermal reactive material disposed in the plurality of pores so that a density of the thermal reactive material in the first region of the thermal conductive composite is lower than that at the second region of the thermal conductive composite.

2. The thermal conductive composite of claim 1, wherein a thermal conductivity of the thermal conductive composite is higher in the first region than the thermal conductivity of the thermal conductive composite in the second region.

3. The thermal conductive composite of claim 1, wherein a thermal expansion coefficient of the thermal conductive material is lower than a thermal expansion coefficient of the thermal reactive material.

4. The thermal conductive composite of claim 1, wherein the thermal reactive material comprises an alkane, and wherein the thermal conductive material comprises a material selected from the group consisting of:
   aluminum oxide ($Al_2O_3$);
   silicon nitride ($Si_3N_4$);
   silicon carbide (SiC); and
   boron nitride (BN).

5. The thermal conductive composite of claim 1, wherein a density of the thermal reactive material in the first region is within the range of 0%-50% by volume ratio and a density of the thermal reactive material in the second region is within the range of 30%-100% by volume ratio.

6. The thermal conductive composite of claim 1, wherein the thermal conductive material is formed into a rigid frame structure having a cavity configured for receiving a heat source and an exoskeleton portion of relatively densely packed thermal conductive material, wherein the first region is disposed more near the cavity and the second region is disposed more near the exoskeleton portion such that the gradient porous structure provides lower porosity near the cavity and higher porosity near the exoskeleton portion.

7. The thermal conductive composite of claim 1, wherein the thermal conductive material is configured for providing a chemical coupling interface between the thermal conductive material and the thermal reactive material.

8. A method for forming a thermal regulatory module comprised of a thermal conductive composite, the method comprising:
forming a frame structure from a thermal conductive material, wherein the thermal conductive material in the frame structure includes a plurality of pores providing a gradient porous structure having a first region of lower porosity and second region of higher porosity, and wherein the frame structure is formed from the thermal conductive material using a fabrication process selected from the group consisting of cold press-sintering, a sol-gel method, electrospinning, centrifugation, and 3D-printing; and
depositing a thermal reactive material into the plurality of pores so as to form the thermal conductive composite, wherein a density of the thermal reactive material in the first region of the thermal conductive composite is lower than that at the second region of the thermal conductive composite.

9. The method of claim 8, wherein forming the frame structure provides porosity in the first region within a range of 0%-50% by volume ratio and porosity in the second region within a range of 30%-100% by volume ratio.

10. The method of claim 8, further comprising:
processing the thermal conductive material of the frame structure prior to depositing the thermal reactive material for providing a chemical coupling interface between the thermal conductive material and the thermal reactive material.

11. The method of claim 10, wherein processing the thermal conductive material of the frame structure comprises:
applying a surface treatment to the thermal conductive material of the frame structure to provide functionalized frame structure having hydroxylated/methoxylated/silylation surfaces; and
preparing a chemical coupling enhanced frame structure from the functionalized frame structure using a silane coupling agent.

12. The method of claim 8, wherein the frame structure includes a cavity configured for receiving a heat source and an exoskeleton portion of relatively densely packed thermal conductive material, and wherein the first region is disposed more near the cavity and the second region is disposed more near the exoskeleton portion such that the gradient porous structure provides lower porosity near the cavity and higher porosity near the exoskeleton portion.

13. The method of claim 12, further comprising:
machining at least a portion of the exoskeleton portion configuring the thermal regulator module for interlocking interfacing with one or more other thermal regulatory modules, wherein a plurality of interlocking thermal regulator modules form a thermal regulatory cooling block.

14. A system comprising:
a first thermal regulatory module comprised of a thermal conductive composite, wherein the thermal conductive composite includes:
a thermal conductive material forming a frame structure, wherein the thermal conductive material in the frame structure includes a plurality of pores providing a gradient porous structure having a first region of lower porosity and second region of higher porosity, wherein the frame structure includes a cavity configured for receiving a heat source, and wherein the first region is disposed more near the cavity than is the second region and the second region is disposed more distant from the cavity than is the first region such that the gradient porous structure provides lower porosity near the cavity and higher porosity more distant from the cavity; and
a thermal reactive material disposed in the plurality of pores so that a density of the thermal reactive material in the first region of the thermal conductive composite is lower than that at the second region of the thermal conductive composite, wherein a density of the thermal reactive material in the first region is within a range of 0%-50% by volume ratio and a density of the thermal reactive material in the second region is within a range of 30%-100% by volume ratio.

15. The system of claim 14, wherein the frame structure includes an exoskeleton portion of relatively densely packed thermal conductive material, and wherein the second region is disposed more near the exoskeleton portion than is the first region.

16. The system of claim 14, further comprising:
a plurality of additional thermal regulatory modules, wherein the first thermal regulatory module is interfaced with one or more thermal regulatory modules of the plurality of additional thermal regulatory modules to form a thermal regulatory cooling block.

17. The system of claim 16, wherein the first thermal regulatory module is configured for interlocking interfacing with the one or more thermal regulatory modules.

18. The system of claim 14, wherein the thermal reactive material comprises a phase change material, and wherein a thermal expansion coefficient of the thermal conductive material is lower than a thermal expansion coefficient of the phase change material.

* * * * *